March 14, 1972   J. CHIN ET AL   3,649,452

NUCLEAR REACTOR FUEL COATED PARTICLES

Filed March 28, 1968

INVENTORS
JACK CHIN
CHARLES S. LUBY
RICHARD G. MILLS

Anderson, Luedeka, Fitch, Even, & Tabin ATTYS.

United States Patent Office 3,649,452
Patented Mar. 14, 1972

3,649,452
NUCLEAR REACTOR FUEL COATED PARTICLES
Jack Chin and Charles S. Luby, San Diego, and Richard G. Mills, Solana Beach, Calif., assignors to the United States of America as represented by the United States Atomic Energy Commission
Filed Mar. 28, 1968, Ser. No. 716,856
Int. Cl. G21c 3/20
U.S. Cl. 176—68   5 Claims

ABSTRACT OF THE DISCLOSURE

A process for producing coated nuclear fuel particles having improved fission product retention by applying a low density pyrolytic carbon layer, followed by a dense silicon or zirconium carbide layer and thereafter a dense isotropic pyrolytic carbon layer. A thin seal layer of an impermeable pyrolytic carbon is deposited between the low density carbon and the metal carbide layer. For certain cases, and particularly where oxide fuel particles are employed, an additional seal layer of an impermeable pyrolytic carbon is deposited immediately adjacent the nuclear fuel core. Further, the particles may include a layer of dense isotropic pyrolytic carbon deposited interior of the metal carbide layer. The exterior dense isotropic layer should have a thermal coefficient of expansion which approximates that of the metal carbide within about 20 percent such that the metal carbide is maintained in compression under subsequent irradiation.

---

This invention relates to processes for coating small particles and more particularly to processes for making nuclear fuel particles having coatings of pyrolytic carbon and metal carbide which are designed for use in a high temperature environment where they will be exposed to high level irradiation for prolonged periods, and to the fuel particles resulting therefrom.

It is well known that pyrolytic carbon coatings are useful in protecting particles of nuclear reactor fuel, i.e., fissile and/or fertile materials, such as uranium, plutonium, and thorium and suitable compounds thereof. There are advantages to be gained if fuel particle coatings have sufficient impermeability to retain gaseous and metallic fission products within the confines thereof. To meet this objective throughout the life of the nuclear fuel particles, the coatings should maintain their structural integrity although exposed to high temperatures and irradiation over prolonged periods of reactor operation. Examples of fuel particles employing pyrolytic carbon coatings are disclosed and described in U.S. Pat. No. 3,325,363, Walter V. Goeddel et al., issued June 13, 1967; No. 3,298,921, Jack C. Bokros et al., issued Jan. 17, 1968; and No. 3,361,638, Jack C. Bokros et al., issued Jan. 2, 1968. Although these fuel particles are well suited for many nuclear energy applications, nuclear fuel particles having still better fission product retention characteristics and/or which can be fabricated more simply and economically are always desired.

As far as fabrication is concerned, there can be various problems in the production of coated particles of nuclear fuel, and these should be anticipated in deciding upon the ultimate fuel particle configuration to be employed. Moreover, problems may occur in production operations which are not encountered in laboratory experiments. Various nuclear fuel materials are subject to hydrolysis, for example thorium and uranium dicarbides, so complications may occur when such materials are exposed to the humidity in the atmosphere. Moreover, the handling of coated particles in transferring them between different coating apparatus may result in damage to coatings that are particularly fragile. The deposition of one coating atop another can sometimes have an undesirable effect upon the characteristics of the former coating at the boundary therebetween. There is always a potential problem of an undesirable chemical reaction occurring between elements in the coating atmosphere and the nuclear fuel materials.

It is an object of the present invention to provide an improved process for coating small particles, particularly nuclear fuel particles, with coatings that do not fail when subjected to high-temperature operation and/or high-level irradiation for long periode of time. It is another object to provide coated nuclear fuel particles which have excellent fission product retention although subjected to operation at high temperatures and high level neutron irradiation for prolonged periods. It is still another object of the invention to provide a process for depositing combinations of pyrolytic carbon and metal carbide coatings in an effective manner to provide coated particles which have the desired nuclear enery characteristics and operational stability. These and other objects of the invention should be apparent from the following detailed description of the production of nuclear fuel particles embodying various features of the invention and in the accompanying drawings wherein:

Figure 1:
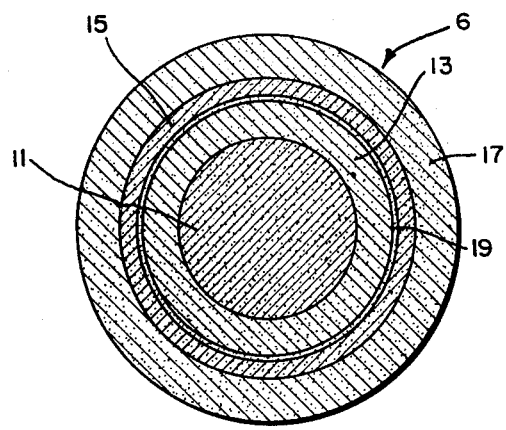
FIG. 1 is an enlarged diagrammatic view of a nuclear fuel particle embodying various features of the invention.

In general, the present invention provides a process for producing nuclear fuel particles which have a central core of fissile or fertile material surrounded by layers of pyrolytic carbon and silicon carbide which provide excellent structural and dimensional stability and fission product retention although exposed to high temperatures and high-level irradiation for long periods. It has been found that by employing seal layers of an impermeable pyrolytic carbon, silicon carbide and dense isotropic pyrolytic carbon can be deposited onto fissile and/or fertile materials without undesirably affecting these nuclear fuel materials. The particular coating processes contemplated are carried out by the thermal decomposition of a carbonaceous component of a gaseous atmosphere to deposit pyrolytic carbon or a carbon-containing product, e.g., silicon or zirconium carbide. Moreover, the process is preferably carried out under conditions which produce a layer of dense isotropic pyrolytic carbon exterior of the metal carbide layer which shrinks onto the metal carbide layer at lower temperatures and maintains the metal carbide layer in compression at the temperature of intended reactor operation.

As used in this application, these two carbon structures are defined as follows:

(1) Laminar carbon possesses layer planes which are preferentially oriented parallel to the surface of the substrate, possesses various apparent crystallite sizes, has a density ranging from 1.5 to 2.2 g./cm.$^3$, and has a microstructure which, when view metallographically under polarized light, is optically active and shows the typical "cross" pattern.

(2) Isotropic carbon possesses very little preferred orientation, has a broad range of apparent crystallite sizes, has a density which may vary from 1.4 to 2.2 g./cm.³, and has a microstructure which, when viewed metallographically under polarized light, is not optically active and is featureless.

The central core of nuclear fuel material to be protected may have any suitable shape, however, materials less than a millimeter in particle size are usually employed. Nuclear fuel in the form of spheroids between about 100 microns and about 500 microns in diameter are preferred for many applications although larger and smaller spheroids may also be used. Core materials in the carbide form or in other suitable forms, such as the oxide, nitride and silicide, which are stable at relatively high temperatures, are generally employed. Four different fuel particles 6, 7, 8 and 9 are shown in the drawings, each having a core carrying the reference numeral 11.

Nuclear fuel materials generally expand during high temperature operation and upon fissioning create gaseous and metallic fission products. Provision is made to accommodate these effects in particular so as to allow prolonged operation under exposure to neutron flux. Particularly if a dense nuclear fuel core 11 is employed, it is desirable to employ a layer 13 of low density material near the outer surface of the core 11 to allow expansion accommodation thereof at a location interior of the outer coatings which constitute the pressure-tight shell of the fuel particles. If a porous nuclear fuel core 11 is employed, it may itself provide the desired accommodation so that employment of a low density layer 13 for this purpose becomes less important.

The layer which surrounds the core should be compatible with the core material both in the environment in which it is deposited and in the environment wherein the fuel particle will be used. It has been found that low density (not greater than about 60 percent of theoretical maximum density) pyrolytic carbon is preferable for use with nuclear fuels. The preferred substance is spongy carbon which, for purposes of this application, is defined as soot-like amorphous carbon having a diffuse X-ray diffraction pattern and a density less than about 60 percent of the theoretical density of carbon (graphite), which density is about 2.21 grams per cm.³. Such spongy carbon is porous to gaseous materials and is also compressible and therefore meets the aforementioned criteria.

Another important attribute of the low density or buffer layer surrounding a nuclear fuel particle is its ability to attenuate fission recoils and thereby prevent structural damage to the outer layers that provide the pressure-tight shell. In general, to accomplish the aforementioned functions of stress accommodation and attenuation of fission product recoils so that cracking or rupturing of outer coatings as a result of damage from fission product recoil is avoided, the buffer layer should have a thickness at least equal to the fission product recoil range. When spongy carbon is employed, a layer of at least about 20 microns is used, and layers of up to about 100 microns may be employed. Generally, it is presently contemplated that layers in the range of 50 to 60 microns will be used.

One of the layers which is disposed exterior of the low density layer 13 in each of fuel particles illustrated is a layer 15 of dense metal carbide having a sufficient thickness to provide excellent retention of fission products therewithin. Moreover, in each of the illustrated fuel particles, a layer 17 of dense isotropic pyrolytic carbon 17 which has very good dimensional stability under high temperature and irradiation conditions is disposed exterior of the metal carbide layer 15.

It has been found that fuel particle production operations are facilitated by providing a seal layer 19 immediately exterior of buffer layer 13. The seal layer 19 should be as thin as possible commensurate with its desired function of providing a gas barrier during the remainder of production, i.e., the subsequent coating of the particles with the layers that will form the pressure-tight jacket. It has been found that a laminar or isotropic carbon is suitable, however, a dense laminar pyrolytic carbon is preferred.

One measure of the preferred orientation of a carbon structure may be determined by measuring the physical properties of the carbon material to determine its Bacon Anisotropy Factor. The Bacon Anisotropy Factor (BAF) is an accepted measure of preferred orientation of the layer planes in a carbon structure. The technique of measurement and a complete explanation of the scale of measurement is set forth in an article by G. E. Bacon entitled "A Method for Determining the Degree of Orientation of Graphite" which appeared in the Journal of Applied Physics, volume 6, page 477 (1956). For purposes of providing an effective seal layer at relatively low thickness, the laminar pyrolytic carbon having a preferred orientation, i.e., a BAF of at least about 2 is preferred.

A layer of laminar pyrolytic carbon having a density of about 1.7 to 2.2 g./cm.³ will provide the desired gas barrier at a thickness as low as one micron. However, because it is always difficult to determine whether extremely small particles, such as those whose size is measured in hundreds of microns, have been uniformly coated over their entire surface, a seal layer about 3 to 7 microns in thickness is usually employed in order to be certain that a sufficient barrier is provided at all points on the surface. Although even thicker layers could be used, it is considered unnecessary to deposit a layer thicker than about seven microns because the additional space that would be then occupied can be put to better use by the employment of a substance which will contribute to the pressure-tight jacket throughout the operational life of the fuel particle. In this respect, it should be understood that the seal layer is employed primarily for production purposes and that it will most likely lose its effectiveness as a gas barrier during its intended operation, such as in the core of a nuclear reactor wherein it will be exposed to high irradiation conditions.

One advantage of employing the seal layer 19 is that it permits transferring the particles from one coating apparatus to another for application of various of the desired layers without the necessity for taking special precautions. Certain nuclear fuel materials, for example uranium and thorium dicarbide, are subject to hydrolysis from the humidity present in the atmosphere. Any potential hydrolysis problems are obviated by the deposition of the seal layer. Although a single coating apparatus might be employed to apply all of the various different layers to be deposited on a particular group of fuel particles, and only one coater may often be used in a laboratory scale operation, for production purposes it may be economically advantageous to employ a separate coating apparatus which is particularly designed and set up to deposit a specific type of pyrolytic carbon or metal carbide. The presence of the seal layer 19 allows the group of particles to be transferred from coating apparatus to coating apparatus in the air without any problems of hydrolysis.

The deposition of the seal layer 19 of a pyrolytic carbon immediately adjacent the exterior of the buffer layer also preserves the character of the buffer layer itself. The buffer layers described hereinbefore are somewhat fragile, and the application of the seal layer 19 protects the buffer layers from physical damage, thereby allowing them to be readily handled for inspection purposes and to be readily transferred to a subsequent coater for the deposition of the exterior layers. To take full advantage of this feature, the seal layer 19 is deposited in the same coating apparatus wherein the buffer layer 13 is applied, as discussed more fully hereinafter. Moreover, as hereinbefore pointed out, the buffer layer 13 is desirably quite porous, and it has been found that the layer of laminar pyrolytic carbon preserves the porosity of the buffer layer and provides a seal layer which prevents any subsequent lessening of the porosity of the buffer layer.

Although various high-temperature stable metal carbides could be used to provide the desired fission product retention, from a standpoint solely of neutron economy it is presently considered that only silicon or zirconium carbide would be suitable because of their low neutron capture cross sections. The deposition of silicon carbide onto the fuel particles is commonly made by the pyrolysis of methyltrichlorosilane in the presence of an excess of hydrogen gas. The pyrolysis reaction results in the production of hydrogen chloride gas as a by-product. Hydrogen chloride gas readily reacts with uranium, and if a uranium-containing core were surrounded only by a porous buffer layer when an exterior layer of silicon carbide was so deposited, the gaseous hydrogen chloride would leach some of the uranium from the core. The seal layer 19 provides a gaseous barrier and effectively eliminates any potential leaching action during the deposition of the silicon carbide coating.

Figure 3:
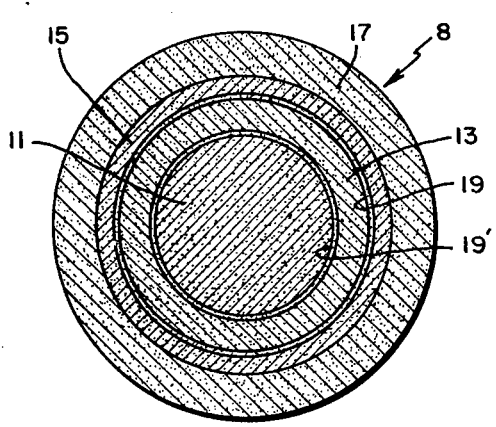
FIG. 3 is a view similar to FIG. 1 of still another nuclear fuel particle embodying various features of the invention.
Figure 4:
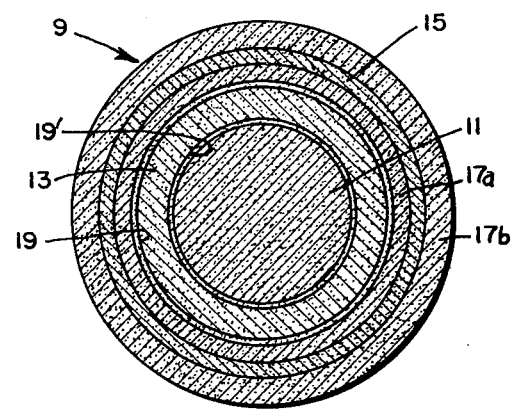
FIG. 4 is a view similar to FIG. 1 of yet another nuclear fuel particle embodying various features of the invention.
Figure 5:
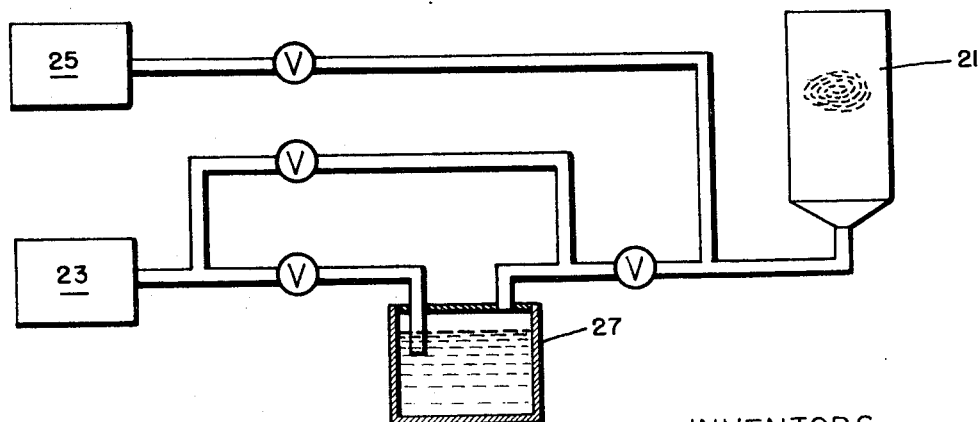
FIG. 5 is a diagrammatic illustration of apparatus suitable for carrying out processes embodying various features of the invention.

Although the fuel particles 6 and 7 are illustrated each with a single seal layer 19 immediately exterior of the buffer layer 13, for certain purposes it may be desirable to provide an additional seal layer 19' which would separate the core 11 from the buffer layer 13. Fuel particles 8 and 9, which are shown in FIGS. 3 and 4, each include such an additional seal layer 19'. Of course, the location of the seal layer 19' in this location provides a gas barrier in the same manner as does the layer 19. However, the seal layer 19' does not provide the same protection to the buffer layer 13 as discussed above, and accordingly when it is used, it is used generally in combination with the seal layer 19. The seal layer 19' prevents migration of uranium into the buffer layer 13 from the core 11. At fairly high temperatures, for example, 1800 to 2200° C., there is some tendency for the migration of uranium to occur. As discussed hereinafter, it may be desirable to deposit dense isotropic pyrolytic carbon within this temperature range. To prevent potential migration of metal from thec ore 11 into the buffer layer 13 while the coated cores are exposed to temperatures of this sort during a subsequent coating step, the seal layer 19' is employed. The seal layer 19' serves an additional essential function for oxide cores, that of preventing the conversion of the oxide core to a carbide during subsequent coating steps. The seal layer 19' has the same physical characteristics as the seal layer 19, i.e., preferably a dense laminar pyrolytic carbon having a thickness of about three to seven microns.

Generally, a continuous layer of silicon or zirconium carbide between about 15 microns to 25 microns in thickness is employed to provide the desired assistance in the containment of fission products and to provide a layer having adequate structural strength to facilitate handling without fear of damage. For its sole function of providing a fission product barrier, the metal carbide need only have a thickness of at least about 5 microns. The thicker layers used are primarily to facilitate handling. Of course, even thicker layers of metal carbide may be employed for fuel particles of relatively large size; however, it is felt that the advantages to be gained with respect to particles of 500 microns or less in size do not justify the use of silicon carbide layers of greater thickness than about 40 microns.

The individual components of the coatings can vary within the ranges mentioned heretofore, and it is difficult to set any rigid value on the total thickness of all the coating together. As a egneral rule of thumb, the total thickness of the composite coating will usually be equal to at least about 35 percent of the size of the nuclear fuel core in order to provide the desired fission product retention.

The silicon or zirconium carbide may be applied in any suitable manner which will give the desired density. To accomplish the desired fission product retention in the thickness ranges enumerated above, the silicon or zirconium carbide should be at least about 90 percent of its theoretical maximum density. Small particles of this type are preferably coated by deposition from a vaporous atmosphere, as in a fluidized bed coating apparatus which is described in more detail in U.S. Pat. No. 3,298,921; however, other known methods of coating may also be employed which will provide continuous coatings of the desired density. When silicon carbide is directly deposited from a mixture of hydrogen and methyltrichlorsilane, density is not a problem because it is common to obtain silicon carbide that is 99% of its maximum theoretical density.

The outer layer should have very good impermeability to gas and should maintain good dimensional stability during neutron irradiation. It has been found that high density pyrolytic carbon which is isotropic exhibits these desirable qualities. For purposes of this application, the isotropic carbon should have a BAF between 1.0 (the lowest point on the Bacon scale) and about 1.2 on the Bacon scale.

Dense isotropic pyrolytic carbon, as defined above, has good thermal conductivity in any direction therethrough and also has high fracture strength. Accordingly, when an outer layer of pyrolytic isotropic carbon is employed to jacket a nuclear fuel core coated with an inner layer of low density carbon and an intermediate layer of dense metal carbide, a product is produced where stability is predictable although exposed to high temperatures and high-density neutron irradiation for prolonged periods of time.

The dense isotropic pyrolytic carbon which s employed can be deposited either at relatively low temperatures i.e., 1250–1400° C. or at higher temperatures, i.e., 1800 to about 2200° C. Deposition of dense isotropic pyrolytic carbon at temperaturese from about 1800° C. to 2200° C. from a mixture of at least 10 percent methane and an inert fluidizing gas, such as helium, is taught in detail in U.S. Pat. No. 3,298,921. The deposition of dense isotropic pyrolytic carbon from propane or butane at temperatures between about 1250° C.–1400° C. from mixtures of about 20–40 percent hydrocarbon with an inert fluidizing gas, such as helium, is taught in detail in U.S. patent application Ser. No. 698,725, filed Jan. 18, 1968. Although the dense isotropic pyrolytic carbon obtained from either such a relatively low temperature deposition or from the higher temperature deposition has generally the same physical characteristics, it is believed that after extended periods of exposure to irradiation, for example, after three years or more, the dimensional stability of the dense isotropic carbon deposited at the higher temperature is superior. Thus, depending upon the intended operational use of the fuel particles, it may be desirable to deposit the dense isotropic carbon using the higher temperature pyrolysis process mentioned above. Irrespective of the temperature at which it is deposited and of whether one or two layers of isotropic pyrolytic carbon are employed, the dense isotropic carbon should be provided in a total thickness of at least about 40 microns inasmuch as it, in combination with the metal carbide layer serves as the pressure-tight fission product containment jacket.

It has been found that the employment of dense isotropic carbon deposited at higher temperatures, i.e., above about 1800° C., can be used advantageously in combination with an interior silicon or zirconium carbide layer to increase the strength thereof.

In order to prevent fracture of the metal carbide layer with consequent failure of the particle the stresses leveled in the metal carbide layer must be maintained within a particular range during the life of the particle. Under irradiation gaseous fission products create a pressure within the particle. The dense isotropic pyrolytic carbon which surrounds th emetal layer has the characteristic that it shrinks under neutron irradiation. This shrinkage provides a compressive force on the metal carbide which counteracts the internal forces which result from the buildup of gaseous fission products. The metal carbide layer is strongest when maintained in slight compression, accordingly it is preferred that the outer isotropic layer initially provide a compressive force on the metal carbide layer and its thickness is such that the shrinkage creates a force sufficient to approximately counteract the force resulting from the buildup of gaseous fission products.

It has been found that if the thermal coefficients of expansion of the isotropic and metal carbide layers are within about 20 percent of each other, the integrity of the carbide layer will be maintained throughout the intended life of the nuclear fuel particles. This range of thermal coefficient of expansion will cause the stresses in the metal carbide layer prior to irradiation to be within the desired range, i.e., slight compressive force to tensile forces, which are below the carbide failure stress level. The thermal coefficient of expansion for silicon carbide in the temperature range of interest is considered to be about $4.5 \times 10^{-6}$ per °C., and thus the conditions under which the dense isotropic pyrolytic carbon is deposited should be such as to produce carbon having a thermal coefficient of expansion of between about $3.5 \times 10^{-6}$ and $5.5 \times 10^{-6}$ per °C. It has been found that the deposition of isotropic carbon having a density of at least about 1.7 g./cm.$^3$ from a 10 percent or greater methane mixture at temperatures between 1800° and about 2300° C. provides carbon which has a thermal coefficient of expansion meeting this criterion.

Referring now to the individual fuel particles illustrated, FIG. 1 shows a basic embodiment wherein the core 11 is surrounded immediately by layer 13 of a low-density pyrolytic carbon upon which is coated a seal layer 19 of dense laminar pyrolytic carbon. Exterior of the seal layer is a layer 15 of dense metal carbide. The outer layer 17 is dense isotropic pyrolytic carbon. The fuel particle 8, shown in FIG. 3, is substantially the same as that illustrated in FIG. 1 with the addition of a second seal layer 19' between the core 11 and the buffer layer 13. The advantage of this additional seal layer as set forth hereinbefore becomes of importance when the exterior isotropic layer 17 is deposited at temperatures above about 1800° C.

Figure 2:
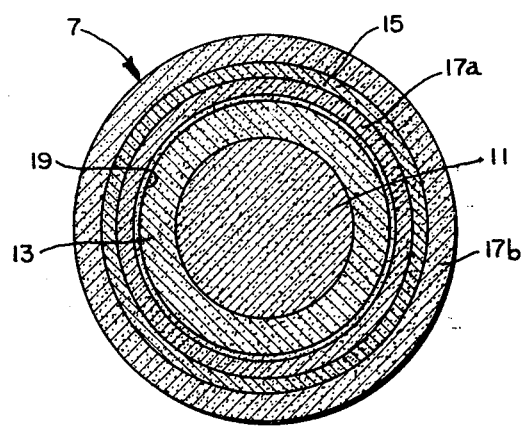
FIG. 2 is a view similar to FIG. 1 of another nuclear fuel particle embodying various features of the invention.

The particle 7, illustrated in FIG. 2, contains the central core 11 surrounded by a layer 13 of low density isotropic carbon. Immediately exterior of the low density layer is a thin seal layer 19 of dense laminar pyrolytic carbon. Immediately adjacent and exterior to the seal layer 19 is a first dense isotropic carbon layer 17a. Next is the layer 15 of dense metal carbide followed by an outer layer 17b of dense isotropic pyrolytic carbon. In general, the sum of the thicknesses of the layers 17a and 17b is approximately equal to the thickness of the layer 17 in the particle 6 shown in FIG. 1. The provision of such a dense isotropic pyrolytic carbon layer interior of the metal carbide layer prevents possible chemical reaction between the material in the nuclear fuel core 11 and the metal carbide. As previously indicated, during the expected life of the fuel particles, the effectiveness of the dense laminar seal layers will likely be destroyed, thus creating a situation wherein it would be possible to have migration of metal atoms through the buffer layer 13 under irradiation conditions. For example, this migration-type phenomenon might result in the interaction between uranium from the core and silicon carbide. The provision of a portion of the dense isotropic carbon as a layer 17a interior of the metal carbide layer 15 substantially eliminates such potential interaction because the dense isotropic pyrolytic carbon layer maintains its effectiveness as a barrier against migration throughout the anticipated lifetime of the fuel particles.

The particle 9 illustrated in FIG. 4 is the same as the particle 7, shown in FIG. 2, with the addition of an additional seal layer 19' between the core 11 and the low density layer 13, the advantage of which has been explained hereinbefore.

The following examples illustrate several processes for producing coated nuclear fuel particles having various features of the invention. Although these examples include the best modes presently contemplated by the inventors for carrying out their invention, it should be understood that these examples are only illustrative and do not constitute limitations upon their invention which is defined solely by the claims which appear at the end of this specification.

EXAMPLE I

Particulate thorium-uranium dicarbide is prepared having a particle size of about 200 microns, being generally spheroidal in shape, and having a thorium to uranium mole ratio of about 3 to 1. A graphite reaction tube 21 having an internal diameter of about 2.5 inches is heated to about 1100° C. while a flow of helium from a source 23 of fluidizing gas is maintained through the reaction tube. When coating is ready to begin, a charge of 100 grams of the cores of thorium-uranium dicarbide is fed into the top of the reaction tube 21, and the flow of helium upward through the tube is maintained at a rate sufficient to levitate the cores and thus create within the tube a fluidized particle bed.

When the temperature of the cores reaches about 1100° C., acetylene gas from a source 25 of hydrocarbon gas is admixed with the helium to provide an upwardly flowing gas stream having a total flow rate of 10,000 cm.$^3$/min. and a partial pressure of acetylene of about 0.80 (total pressure 1 atm.). The acetylene decomposes and deposits low density, spongy carbon upon the cores. Flow of the acetylene is continued for a sufficient time to deposit upon each of the cores a layer about 50 microns thick of spongy pyrolytic carbon having a density of about 1.2 g./cm.$^3$.

The flow of acetylene is then terminated, and the temperature is raised to about 1200° C. At this temperature the flow of gas is adjusted to provide a mixture of methane, at a rate of 4000 cm.$^3$/min., and helium, at a rate of 6000 cm.$^3$/min. Coating is carried out under these conditions for about five minutes. Then the methane flow is terminated, and the coated spheroids are slowly cooled to room temperature. Examination shows that each of the coated spheroids contains an outer layer about 5 microns thick of laminar pyrolytic carbon having a density of about 1.9 g./cm.$^3$ and a BAF of about 6.

The coated cores are returned to the reaction tube 21, and the temperature of the reaction tube is raised to about 1500° C. Hydrogen is employed as the fluidizing gas at a rate of 10,000 cm.$^3$/min., and approximately 10 percent of the hydrogen stream is bubbled through a bath 27 of methyltrichlorosilane. These conditions are maintained for about 1 hour, by the end of which time silicon carbide is uniformly deposited upon each of the carbon-coated spheroids in the form of a layer about 20 microns thick. Subsequent examination and measurement shows that the silicon carbide is beta phase SiC having a density of about 3.18 g./cm.$^3$, which is about 99 percent of the theoretical density of SiC (3.215 g./cm.$^3$).

The silicon-carbide coated cores are maintained in fluidized condition, substituting helium as the fluidizing gas, and the temperature is lowered to about 1400° C. At this temperature, the flow of gas is altered to provide a mixture of propane at 3,000 cm.$^3$/min. and helium at 7,000 cm.$^3$/min. Coating is carried on for about 10 minuntes, during which time a layer about 50μ thick of isotropic carbon is deposited on each of the coated spheroids. The isotropic carbon has a density of about 1.95 g./cm.$^3$ and a BAF of about 1.1.

Testing of the coated particles is carried out by disposing them in a suitable capsule and subjecting them to neutron irradiation at an average temperature of about 1325° C. During the time of irradiation, the total fast neutron dose is estimated to be about $2.5 \times 10^{21}$ neutrons/cm.$^2$ (using neutrons of energy greater than about 0.18 mev.). After burnup of over 10 percent of the metal atoms, no coating failures are apparent and the dimensional stability of the coatings is completely satisfactory. The fission product retention of these particles is within acceptable limits.

EXAMPLE II

A 100-gram charge of uranium dioxide spheroids having diameters of about 200 microns is prepared, the uranium having an enrichment of about 93 percent. These spheroids are initially coated with a 5-micron thick layer of dense laminar pyrolytic carbon in the same manner as the laminear carbon was deposited in Example I. The coated spheroids are then treated exactly as in Example I to deposit a layer of spongy pyrolytic carbon about 50 microns thick thereon, followed by another 5-micron thick layer of dense laminear pyrolytic carbon.

The temperature of the reaction tube is then raised to about 1500° C., and hydrogen is substituted as the fluidizing gas. A 20-micron thick layer of dense silicon carbide is deposited upon each of the coated spheroids in the same manner as in Example I.

The silicon-carbide coated cores are maintained in fluidized condition, and the temperature thereof is raised to about 1800° C. At this temperature, the flow of gas is altered to prokvide a mixture of methane ,at 2,000 cm.³/min., and helium at 8,000 cm.³/min. Coating is carried on for about 30 minutes, during which time a layer of about 50μ thick of isotropic carbon is deposited on each of the coated spheroids. The coated spheroids are slowly cooled to room temperature and examined. The isotropic carbon has a density of about 1.9 g./cm.³ and a BAF of about 1.05. It also has a greater thermal coefficient of expansion than the silicon carbide and is shrunken onto the SiC layer placing it in compression.

Testing of the coated spheroids is carried out by disposing them in a suitable capsule and subjecting them to neutron irradiation under the conditions set forth in respect of Example I. After burnup of over 10 percent of the fissile atoms, no coating failures are apparent. The fission product retention and dimensional stability of these particles is considered excellent.

EXAMPLE III

A 100-gram charge of uranium dicarbide spheroids having diameters of about 200 microns is prepared having an enrichment of about 93%. These spheroids are initially coated with a 5-micron thick layer of dense laminar pyrrolytic carbon in the same manner as the laminar carbon is deposited in Example I. The temperature of the reaction tube 21 is then lowered to 1100° C. At this temperature the gas flow rate is changed to provide a mixture of acetylene at 9000 cm.³/min. and helium at 1000 cm.³/min. Exposure to this atmosphere for about a minute results in the deposition of a buffer layer of spongy pyrolytic carbon about 30 micron thick and having a density of about 1.1 g./cm.³. At the end of this period of time, the acetylene flow is terminated and the temperature is raised to 1200° C. At this temperature a 5-micron layer of dense laminar pyrolytic carbon is deposited in the same manner as in Example I.

The temperature is then raised to about 2000° C. When this temperature is reached, a gas flow of 2000 cm.³/min. of methane and 8000 cm.³/min. of helium is employed. After about twenty minutes, the methane flow is terminated. By this time, a layer approximately 20 microns thick of isotropic pyrolytic carbon having a density of about 1.95 g./cm.³ and a BAF of about 1.05 is deposited on each of the particles.

The temperature is then lowered to about 1500° C. and a 20-micron thick layer of dense silicon carbide is deposited in the same manner as in Example I. After completion of the deposition of the silicon carbide layer, the temperature is again raised to about 2000° C. and other layer of dense isotropic pyrolytic carbon about 25 microns in thickness is deposited in the same manner as indicated above.

The coated particles are slowly cooled to room temperature and examined. Examination shows that the isotropic pyrolytic carbon has a higher thermal coefficient of expansion than the silicon carbide and that upon cooling the exterior layer of isotropic carbon has shrunken onto the silicon carbide layer, placing the silicon carbide layer in compression.

Testing of the coated particles is carried out as in Example I. After burnup of over 10 percent of the fissile atoms, no coating failures are apparent and the dimensional stability of the coatings is completely satisfactory. The fission product retention of these particles is well within acceptable limits.

EXAMPLE IV

The process set forth in Example III is repeated, except that, instead of depositing a 20-micron thick layer of silicon carbide, a 20-micron thick layer of dense zirconium carbide is deposited. The zirconium carbide is deposited upon the coated spheroids heated to a temperature of about 1800° C., using a mixture containing a minor portion of methane and a major portion of hydrogen. Instead of employing a liquid bath 27, a part of the hydrogen flow is passed through a bed of crystalline $ZcCl_4$ which is heated to a temperature of 230° C. The zirconium carbide deposited has a density about 92 percent of theoretical maximum density.

The coated particles are tested as set forth in Example I. The fuel particles, after over 10 percent burnup, show excellent fission product retention and dimensional stability and are considered well-suited for nuclear reactor applicators.

EXAMPLE V

A 100-gram charge of uranium dicarbide particles is prepared which have a density about 95 percent of maximum theoretical density and which are spheroids about 100 microns in diameter. About 20 grams of these spheroids are fluidized in a 2.5 inch diameter coater using a flow of approximately 3000 cm.³ of helium per minute. After the temperature of the spheroids reaches 1000° C., acetylene is substituted at a like flow rate for the entire flow of helium. After approximately four minutes, the acetylene flow is terminated by substitution of helium. During the coating period, the particles are each coated with a layer about 65 microns thick of spongy pyrolytic carbon having a density of about 1 g./cm.³.

The temperature is then raised to about 1100° C., and a mixture of 15 percent acetylene and 85 percent helium is substituted for a sufficient time to deposit about a 5-micron thick layer on each of the particles. The layer deposited is laminar pyrolytic carbon having a density of about 1.95 g./cm.³ and having a BAF of about 5.5.

A 20-micron thick layer of silicon carbide and an exterior 50-micron thick layer of dense isotropic pyrolytic carbon are successively deposited upon the coated spheroids in accordance with the procedure set forth in Example I.

The particles are tested under irradiation in accordance with the procedure set forth in Example I, and they are considered to be as satisfactory from the standpoint of fission product retention and dimensional stability as those particles produced in Example I.

Various of the features of the invention are set forth in the claims that follow.

What is claimed is:
1. Nuclear fuel particles comprising:
    a central core including fissile or fertile material, a continuous buffer layer of relatively low density pyrolytic carbon having a thickness of at least about 20 microns surrounding said core, a first seal layer of a dense laminar impermeable pyrolytic carbon of sufficient thickness to provide a gas barrier disposed in surrounding contact relation to said layer of low density pyrolytic carbon, said laminar carbon having a density in the range of about 1.7 to 2.2 g./cm.³ and a Bacon Anisotropy Factor of at least about 2, a continuous layer of dense silicon or zirconium carbide located in surrounding contact relation with respect to said seal layer, and a continuous layer of dense isotropic impermeable pyrolytic carbon disposed in contact with the exterior surface of and completely encompassing said metal carbide layer, said dense isotropic pyrolytic carbon having a Bacon Anisotropy Factor between about 1.0 and 1.2 and a coefficient of expansion within about 20% of that of said metal carbide layer wherefor said isotropic pyrolytic carbon layer exerts a compressive force on said metal carbide layer, wherein a second seal layer of said dense laminar impermeable pyrolytic carbon is provided, said second seal layer being disposed between said core and said low density buffer layer.

2. Nuclear fuel particles in accordance with claim 1 wherein said dense laminar impermeable layer has a thickness in the range of about 1 to 7 microns and a Bacon Anisotropy Factor of about 6.

3. Nuclear fuel particles in accordance with claim 1 wherein said low density buffer layer is spongy carbon having a density less than about 60 percent of the theoretical maximum density of graphite.

4. Nuclear fuel particles in accordance with claim 3 wherein the thickness of said dense isotropic carbon is at least about 40 microns and wherein said metal carbide layer is between about 10 and 25 microns thick.

5. Nuclear fuel particles in accordance with claim 1 wherein a second layer of said dense impermeable isotropic pyrolytic carbon is provided, said second layer of isotropic pyrolytic carbon being disposed between said metal carbide layer and said first seal layer of dense laminar impermeable pyrolytic carbon.

References Cited
UNITED STATES PATENTS

| | | | |
|---|---|---|---|
| 3,179,723 | 4/1965 | Goeddel | 264—15 |
| 3,212,989 | 10/1965 | Fitzer et al. | 176—91 X |
| 3,249,509 | 5/1966 | Blocker | 176—67 |
| 3,265,519 | 8/1966 | Diefendorf | 117—8 |
| 3,290,223 | 12/1966 | Blocker et al. | 176—67 |
| 3,298,921 | 1/1967 | Bokros et al. | 176—67 |
| 3,312,597 | 4/1967 | Glueckauf | 176—67 |
| 3,325,363 | 6/1967 | Goeddel | 176—91 X |
| 3,361,638 | 1/1968 | Bokros et al. | 176—91 |

CARL D. QUARFORTH, Primary Examiner

G. G. SOLYST, Assistant Examiner

U.S. Cl. X.R.

176—91 SP; 252—301.1